N. A. WITHERELL.
Cheese-Rings.

No. 154,627.

Patented Sept. 1, 1874.

Witnesses.
A. F. Cornell.
S. A. Raymond.

Inventor.
N. A. Witherell.
Per. Burridge & Co.
Attorneys.

UNITED STATES PATENT OFFICE.

NOBLE A. WITHERELL, OF SOLON, OHIO.

IMPROVEMENT IN CHEESE-RINGS.

Specification forming part of Letters Patent No. 154,627, dated September 1, 1874; application filed June 30, 1874.

*To all whom it may concern:*

Be it known that I, NOBLE A. WITHERELL, of Solon, in the county of Cuyahoga and State of Ohio, have invented a certain new and Improved Cheese-Ring; and I do hereby declare that the following is a full, clear, and complete description thereof, reference being had to the accompanying drawing making part of the same.

Figure 1:
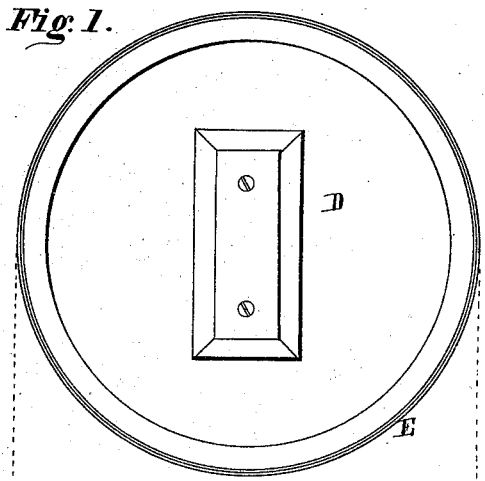
Figure 2:
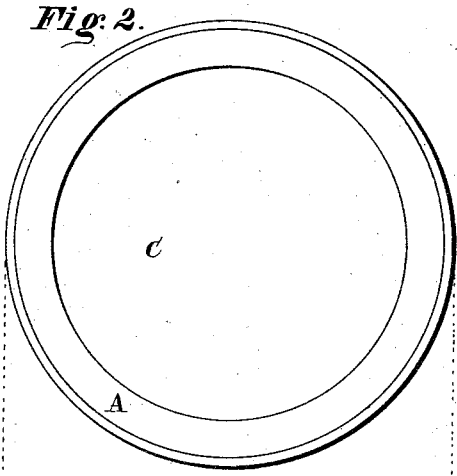
Figure 3:
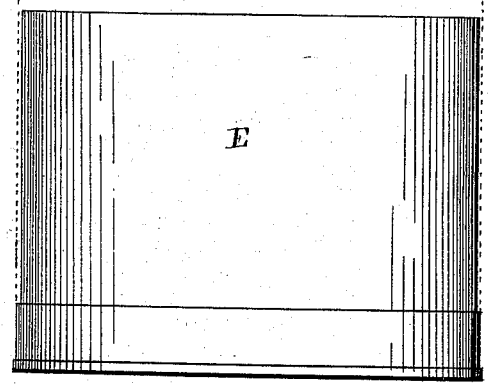
Figure 3:
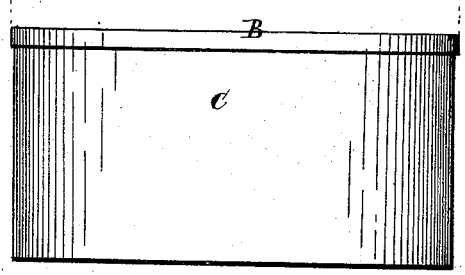
Figure 3:
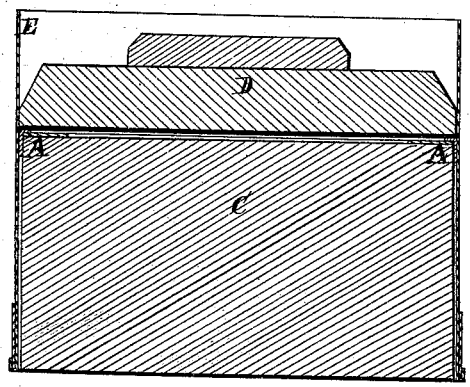

Figure 1 is a top view of a cheese-hoop and follower. Fig. 2 is a view of a cheese having thereon a cheese-ring, the matter of this invention. Fig. 3 is a transverse vertical section.

Like letters of reference refer to like parts in the several views.

The nature of this invention relates to a ring, the object whereof is to prevent the edge or corners of a cheese, while under pressure, from being forced up between the edge of the follower and the side of the cheese-hoop.

In the manufacture of cheese it is a matter of great difficulty to prevent the edge of the cheese, while under pressure, from being forced up between the edge of the follower and the side of the hoop. To prevent this the curd is cased in a bandage. The follower is also made to fit close in the hoop. Notwithstanding these precautions the curd or cheese is forced up between the follower and the hoop more or less, for the reason that the follower cannot be made so close fitting as to be tight; for in that case it would not move freely in the hoop, and then the follower shrinks, causing a considerable space between it and the hoop into which the pressing cheese is forced. That part of the cheese forced between the follower and the hoop is sometimes considerable. This has to be pared off and is thrown away, an operation requiring much time, labor, and loss of cheese; also, this paring off the edge of the cheese injures it by rendering it liable to crack, as it never heals over in the process of curing. In these cracks and tender edge of the cheese the flies first make their attack.

To avoid this difficulty is the purpose of the ring above specified; which consists of a right angled or double flanged ring, of which A, Fig. 2, represents the upper side or flange, and B the vertical one or side flange. This ring is simply placed upon the edge or rim of the cheese, as shown in Fig. 2, after the bandage has been properly adjusted. In said figure C represents the cheese, a transverse section whereof and the ring, together with the follower D and hoop E, are shown in Fig. 3. By said figure the application of the ring will be readily understood.

It will be obvious that by the use of the abovesaid ring the corners of the cheese cannot be forced up between the follower and the hoop, but will be confined in the angle of the ring, so that the cheese will come from the hoop with square, clean, and smooth edges or corners. The ring is represented as being cut through in one place. This is to allow it to adjust itself to the cheese-hoop by expanding or contracting, as the case may be. The ends lap onto each other to prevent the curd from passing between the ends of the ring.

The ring, although made of one piece, may consist of several sections, without changing the essential character of my invention.

What I claim as my invention, and desire to secure by Letters Patent, is—

The herein-described angular auxiliary ring or hoop, consisting of the sides A and B, embracing horizontally and vertically the upper periphery of the substance pressed, in combination with the hoop E and follower D, in the manner substantially as described, and for the purpose specified.

NOBLE A. WITHERELL.

Witnesses:
J. H. BURRIDGE,
J. H. WARREN.